(12) United States Patent
Weinstein

(10) Patent No.: US 11,948,012 B2
(45) Date of Patent: Apr. 2, 2024

(54) MONITORING PROCESS FOR INTERMITTENT AND TEMPORARY TRANSFERS

(71) Applicant: Lior Weinstein, Atlanta, GA (US)

(72) Inventor: Lior Weinstein, Atlanta, GA (US)

(73) Assignee: POPLAR TECHNOLOGIES INC., Roswell, GA (US)

( * ) Notice: Subject to any disclaimer, the term of this patent is extended or adjusted under 35 U.S.C. 154(b) by 0 days.

(21) Appl. No.: 18/101,163

(22) Filed: Jan. 25, 2023

(65) Prior Publication Data

US 2023/0237495 A1 Jul. 27, 2023

Related U.S. Application Data

(60) Provisional application No. 63/302,594, filed on Jan. 25, 2022.

(51) Int. Cl.
*G06Q 40/00* (2023.01)
*G06F 9/451* (2018.01)
(Continued)

(52) U.S. Cl.
CPC ............ *G06F 9/5027* (2013.01); *G06F 9/451* (2018.02); *G06F 9/5033* (2013.01); *G06F 9/542* (2013.01);
(Continued)

(58) Field of Classification Search
CPC .......................... G06Q 20/4016; G06Q 20/389
See application file for complete search history.

(56) References Cited

U.S. PATENT DOCUMENTS 5,978,778 A * 11/1999 O'Shaughnessy ..... G06Q 40/04
705/37
10,891,613 B1    1/2021 Schindler
(Continued)

FOREIGN PATENT DOCUMENTS

GB         2510250      *  7/2014   ............. G06Q 40/06
WO    WO-2017149524 A1 *  9/2017   ......... G06F 16/9535
WO    WO-2020264224 A1 * 12/2020   ............. G06Q 40/08

OTHER PUBLICATIONS

Weber, "How much cash is in crypto?" Oesterreichische Nationalbank, 2021. (Year: 2021).*
(Continued)

*Primary Examiner* — Abhishek Vyas
*Assistant Examiner* — William B. Bunker
(74) *Attorney, Agent, or Firm* — Buckley, Maschoff & Talwalkar LLC

(57) ABSTRACT

Provided are systems and methods for auto-performing short-term investments on an intermittent basis via a crypto-network and returning the principal and interest before the cash is needed. As an example, the method may include installing a blockchain smart contract on a blockchain ledger with read access to content stored on the blockchain ledger, establishing a communication channel between a monitoring engine and the blockchain smart contract, configuring the monitoring engine to identify stop conditions from content stored on the blockchain ledger, monitoring the blockchain ledger for updates to content stored on the blockchain ledger via the communication channel and detecting a stop condition based on an update to the blockchain ledger via the monitoring engine, and in response the detected stop condition, transmitting a request to the crypto-exchange server to return the funds to the external data source.

18 Claims, 14 Drawing Sheets

(51) Int. Cl.
*G06F 9/50* (2006.01)
*G06F 9/54* (2006.01)
*G06Q 20/36* (2012.01)
*G06Q 20/38* (2012.01)
*G06Q 20/40* (2012.01)
*G06Q 40/06* (2012.01)

(52) U.S. Cl.
CPC ....... *G06Q 20/3678* (2013.01); *G06Q 20/389* (2013.01); *G06Q 20/4016* (2013.01); *G06Q 40/06* (2013.01); *G06Q 2220/00* (2013.01)

(56) References Cited

U.S. PATENT DOCUMENTS

| | | |
|---|---|---|
| 11,176,531 B1 | 11/2021 | Tomkins et al. |
| 2005/0273409 A1 * | 12/2005 | Voudrie ................. G06Q 40/12 705/36 R |
| 2005/0273410 A1 * | 12/2005 | Voudrie ................. G06Q 40/00 705/36 R |
| 2005/0273411 A1 * | 12/2005 | Voudrie ................. G06Q 40/12 705/36 R |
| 2005/0273412 A1 * | 12/2005 | Voudrie ................. G06Q 40/04 705/36 R |
| 2006/0167779 A1 * | 7/2006 | Turner ................... G06Q 40/04 705/37 |
| 2011/0047097 A1 * | 2/2011 | Turner ................... G06Q 40/04 705/37 |
| 2019/0378207 A1 | 12/2019 | Dibner-Dunlap et al. |
| 2020/0219190 A1 * | 7/2020 | Payton ................... G06Q 40/04 |
| 2020/0258158 A1 * | 8/2020 | Gilliam ................... G06Q 40/03 |
| 2021/0049685 A1 * | 2/2021 | Tachau ................... G06Q 40/03 |
| 2021/0241243 A1 | 8/2021 | Wiklof et al. |
| 2021/0264520 A1 * | 8/2021 | Cummings ............. G06Q 40/12 |
| 2021/0319436 A1 | 10/2021 | Ow et al. |
| 2021/0342825 A1 * | 11/2021 | Le Calvez .............. G06Q 20/02 |
| 2022/0122182 A1 * | 4/2022 | Marshall ................ G06Q 40/06 |

OTHER PUBLICATIONS

The International Search Report and Written Opinion dated Apr. 18, 2023 which was issued in connection with PCT Application No. PCT/US23/11495, 11 pages.

* cited by examiner

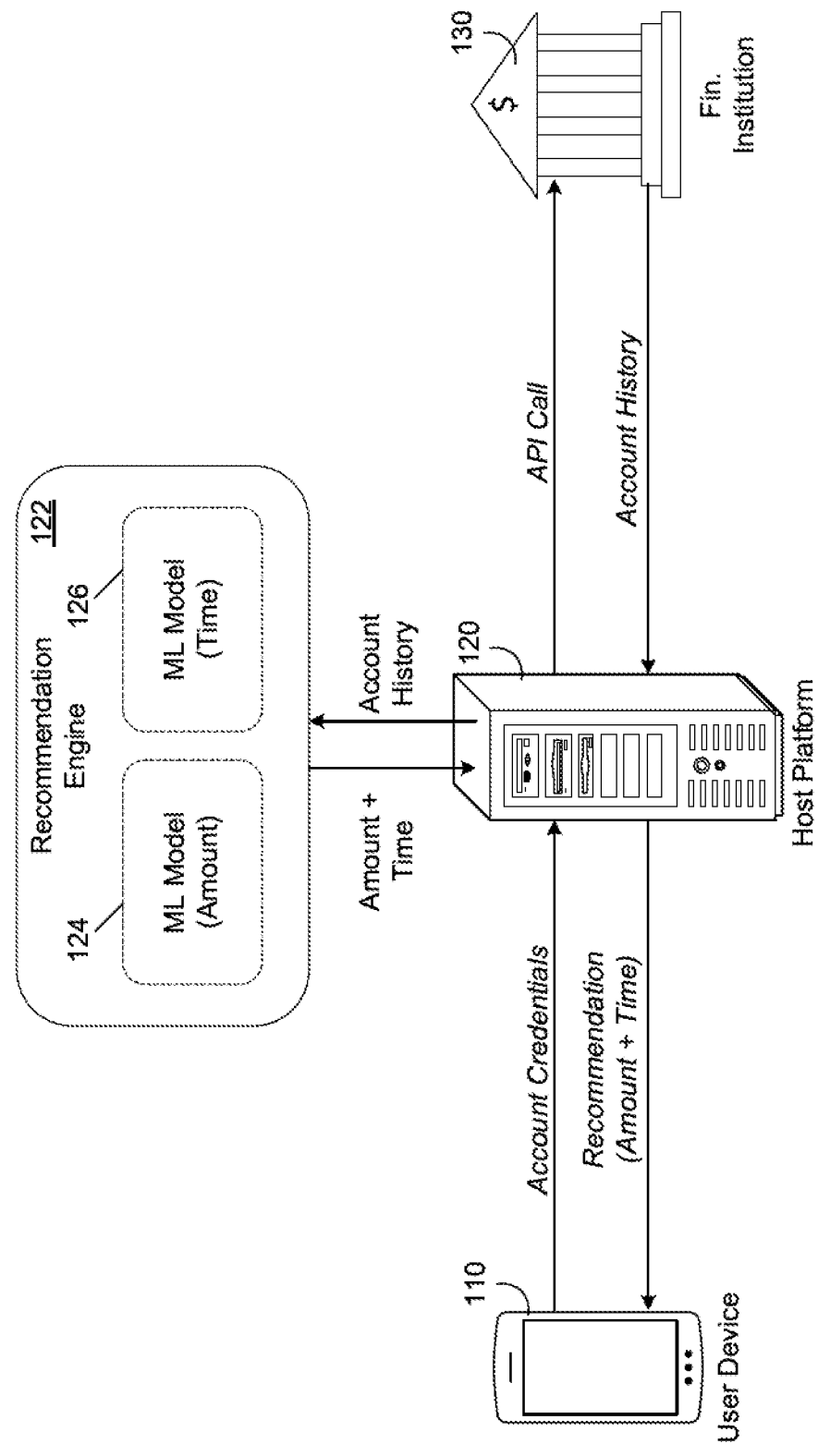

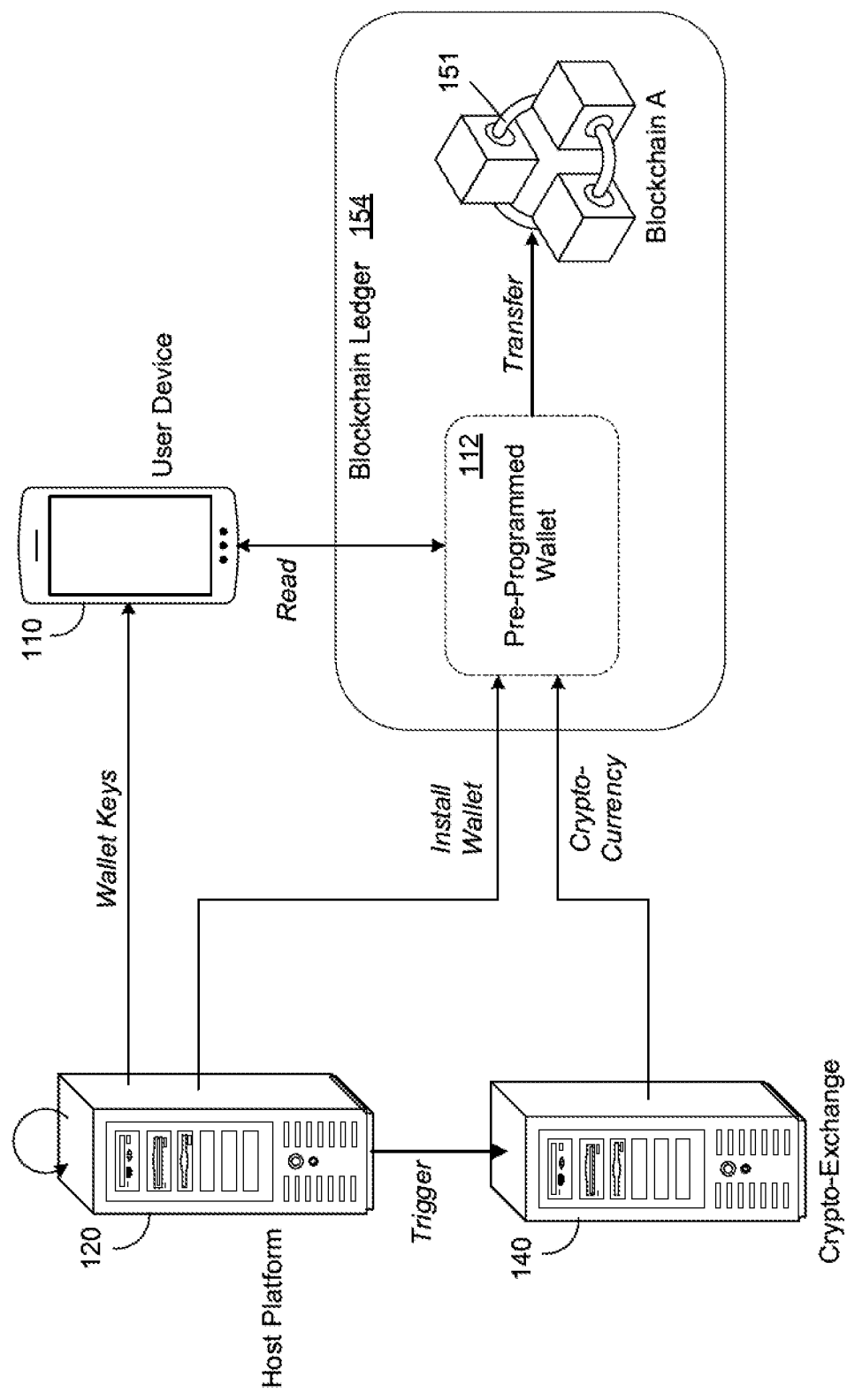

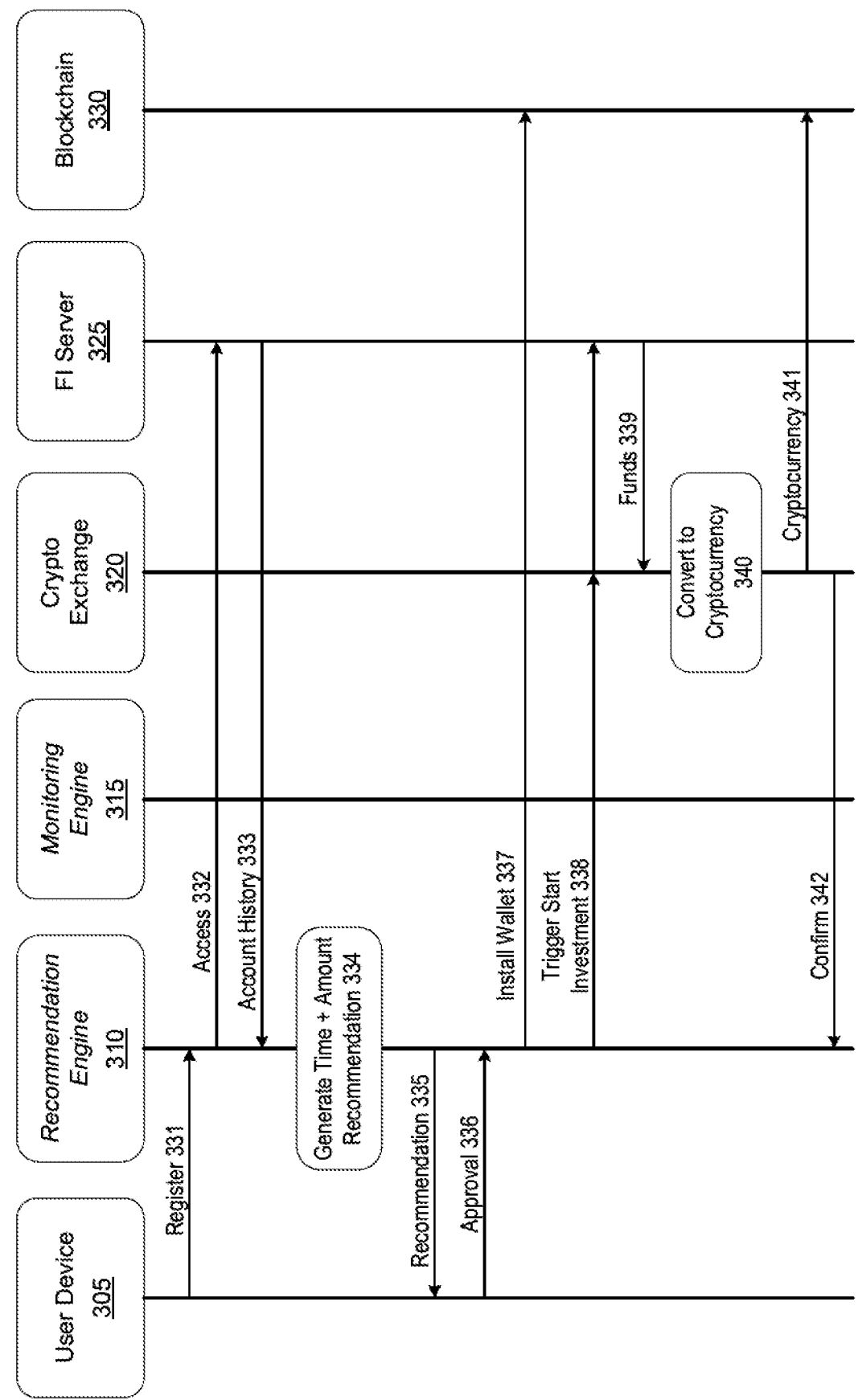

700   FIG. 7
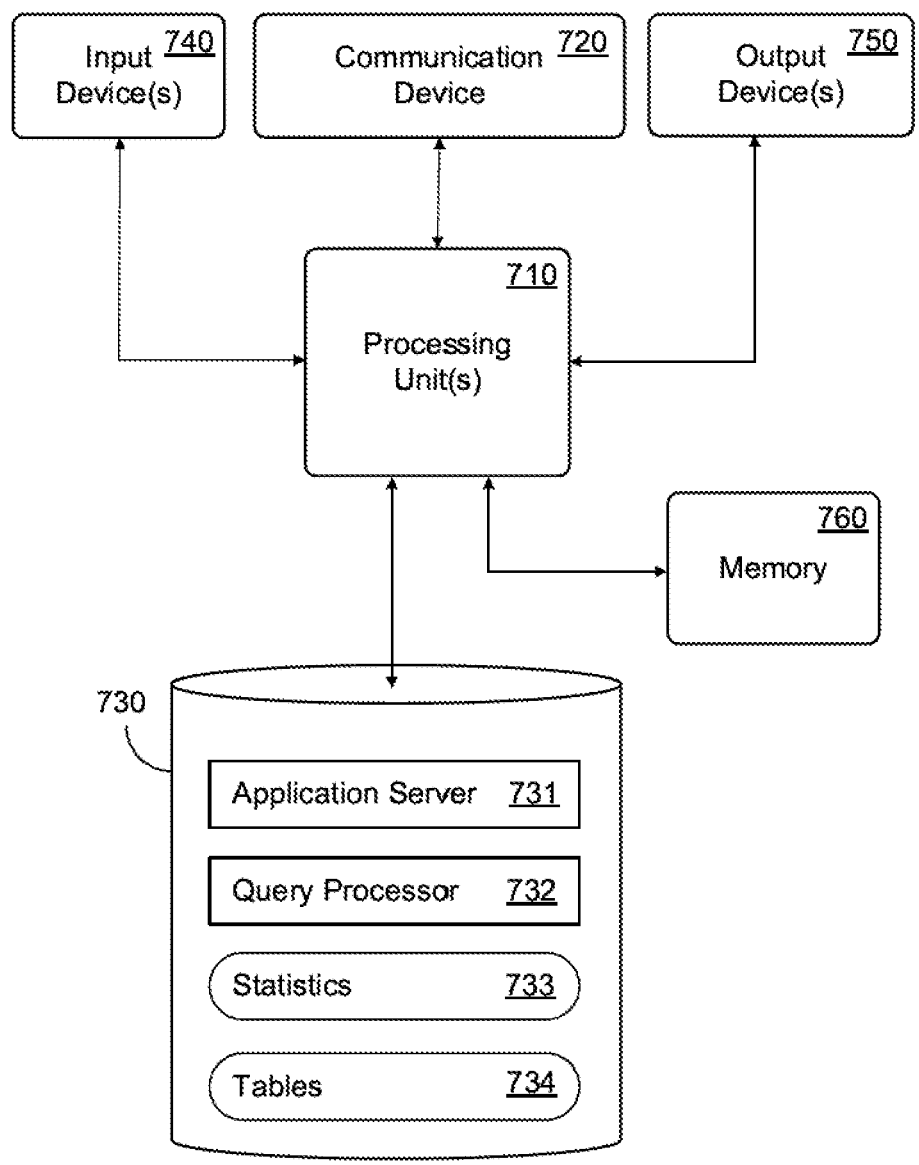

US 11,948,012 B2

MONITORING PROCESS FOR INTERMITTENT AND TEMPORARY TRANSFERS

CROSS-REFERENCE TO RELATED APPLICATIONS

The present application claims the benefit under 35 USC § 119(e) of US Provisional Patent Application No. 63/302,594, filed on Jan. 25, 2022, in the United States Patent and Trademark Office, the entire disclosure of which is incorporated herein by reference for all purposes.

BACKGROUND

Traditional bank accounts do not provide much interest for an account holder. As an example, a savings account or a checking account may earn an account holder (e.g., a person, a group of people, an organization, etc.) between 0.1% interest and 0.5% interest on the funds in the account over the course of a year. The interest is usually not very much especially for smaller invested amounts. Furthermore, understanding how to invest your money in a way that is safe and profitable is a daunting task. Investments typically require long-term commitments in order for the investment to mature into any significant value. During this time, which can be over many years, the invested money is untouchable to the account holder. Therefore, keeping money in your savings account/checking account may be a safer way to grow wealth because it keeps your money available in case of unexpected expenses.

SUMMARY

The example embodiments are directed to a host platform, such as a mobile application host, which may be accessed by a user via a mobile device (e.g., a smart phone) by the user installing a front-end application of the mobile application on their device. The application may be downloaded and installed from an application marketplace or the like. The user (account holder) may then enter information about themselves as well as a savings account number or checking account number. In response, the host platform may periodically pull account balance information (e.g., total balance, debits, credits, etc.) from the user's account from a period of time (e.g., the last 5 years, etc.) and analyze the information using machine learning.

For example, the account balance and history information may be input into a machine learning service which includes one or more machine learning models which can predict temporary investments using funds for the account holder's account that can return more interest than what the account holder is currently making from their bank. In particular, the models can predict an amount of "idle cash" or idle value which is currently held in the bank account and which can safely be invested without risk of the account going into default on a future payment. The models can also predict a period of time for the investment (e.g., 10 days, 15 days, 20 days, etc.) which also relieves the user from risk of missing any payments, bills, etc. The machine learning service can identify these attributes based on patterns of the account balance over time.

Furthermore, the host platform may transfer funds from the user's bank account to an investor system, such as a crypto-exchange server, which invests the funds in crypto-based assets such as staking the investment on a stable coin blockchain network, or some other crypto-investment vehicle. The transferred funds (e.g., fiat currency) may be converted into cryptocurrency by the partner system and staked or otherwise transferred to a blockchain network where the investment is being performed.

Here, the transfer is temporary. For example, the investment may remain within the blockchain network until a predefined interest some default condition such as a value threshold being obtained (e.g., the money has earned 8%, etc.) or until a predetermined period of time has elapses (e.g., 10 days, 15 days, 20 days, etc.) In some embodiments, the host platform may set a default condition for the return of the investment while also monitoring for stop conditions which, if detected, cause the host platform to terminate the investment earlier than expected (i.e., prior to the default time of return). When the return is desired, the host platform may trigger the investment system to transfer cryptocurrency from the investment including the interested earned back to a wallet controlled by the investment system (and accessible to the host and the user), and converted back into fiat currency. Furthermore, the investment system may transfer to the fait currency back to the user via traditional payment means (wire transfer, check, cash, etc.) As another example, the host platform may transfer the funds back via a blockchain network.

Other features and aspects may be apparent from the following detailed description, the drawings, and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 1A-1D are diagrams illustrating a temporary investment process using machine learning in accordance with example embodiments.

FIG. 3A is a diagram illustrating a communication sequence of a temporary investment process in accordance with example embodiments.

FIG. 7 is a diagram illustrating a computing system for use with any of the example embodiments described herein.

Figure 1A:
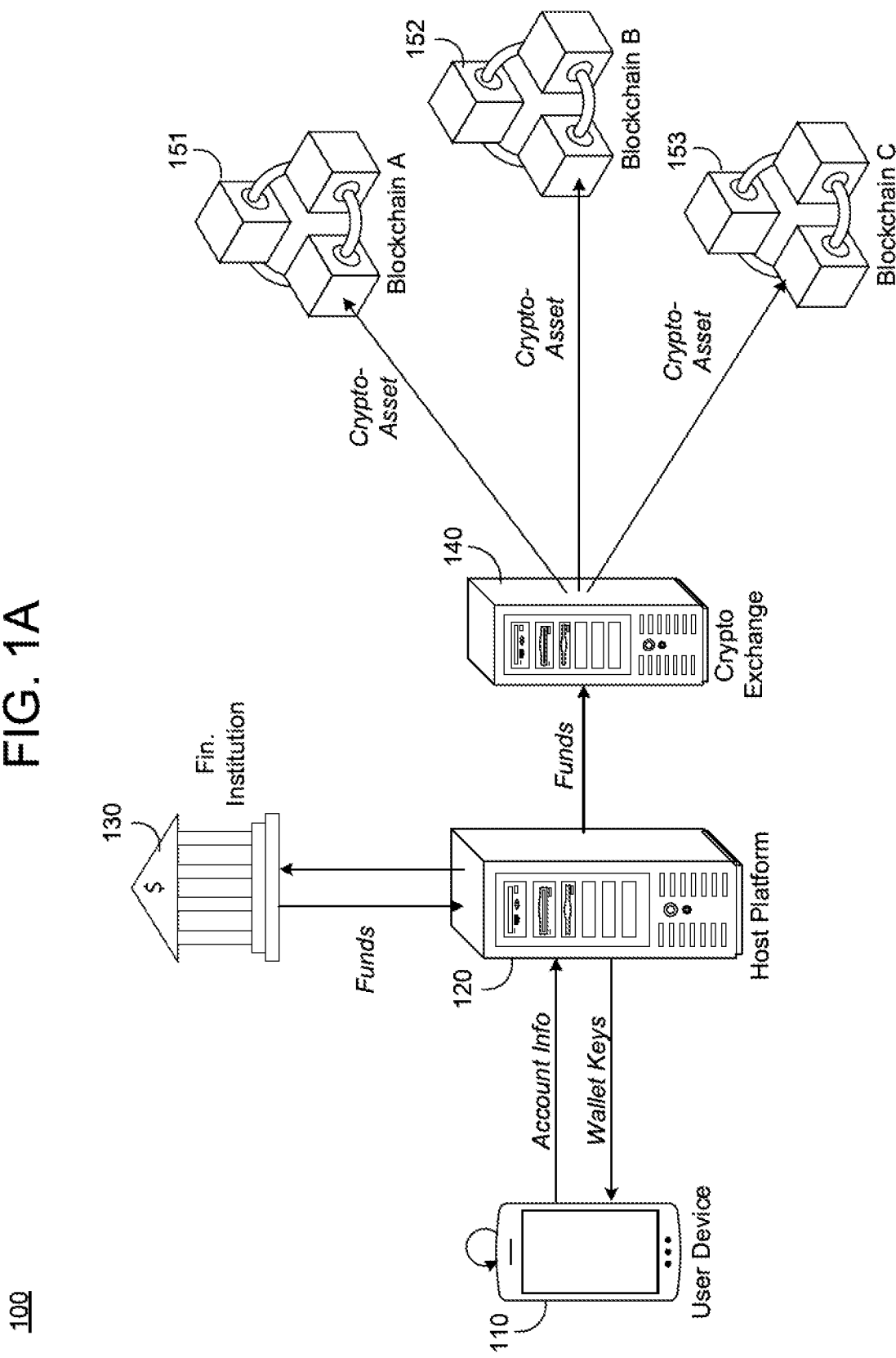

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a host platform, such as a cloud platform, web server, distributed database, etc., which hosts a software application such as a mobile application, a web application (e.g., a progressive web application, etc.), or the like, which can be downloaded from an application marketplace and installed on a user device such as a mobile phone, a tablet, a laptop, a smart-wearable, a personal computer, a server, and the like. The application may have a front-end client that runs on the user's device and a back-end that is hosted on the host platform and that communicates with the front-end of the application on the user's device via a network such as the Internet.

A user may input a bank account number or other account identifying information, and the application may contact the corresponding bank that issued the bank account based on the bank account number. The user may also be an "organization" or "group of users" and not just a single user. Here, the account being invested may be an account with funds of multiple users or an organization that uses the funds for payment or other means with multiple users. In these examples, the user/accountholder may authorize the host platform to access the bank account and perform a temporary withdrawal and investment. The amount that is withdrawn and the time window for the investment may be manually input by the user. As another example, the host platform may provide one or more machine learning models which analyze the user's transaction history (e.g., over the past few years, etc.) and recommend how much money the user should invest on a temporary basis, and for how much time (e.g., a few days, a few weeks, etc.).

According to various embodiments, the machine learning model(s) may receive account balance history information, transaction history, debits, credits, etc. and predict how much money will be safely available (e.g., with a comfortable cushion) to invest for a few days or a few weeks. The model(s) may also identify a time period for the investment. If the model(s) determines that $20,000 will be available for a two-week period, and then the user will need the money back to purchase supplies, the model(s) can recommend an investment window of 10 days for the purpose of the application is to gain valuable interest on the funds inside the bank account in the short-term. However, instead of recommending $20,000, the model may recommend $15,000 as an investment in order to leave a safety cushion just in case unexpected expenses occur. The total amount, the cushion, the time period, etc., may be output by the model(s) in response to receiving the account history information as input.

As an example, a user's bank account (e.g., savings account, checking account, debit account, etc.) may earn the user 0.3% interest a year from a financial institution that issued the bank account. Over the course of a year, the interest earned on a savings account with $100,000 to start, will be approximately $300. In contrast, with the software application described herein, a user's bank account may earn them 5-10% interest a year, or more. Over the course of a year, the interest earned on the same savings account with $100,000 to start will be approximately $5000-$10,000, or 15 to 30 times more interest than they would have earned by simply leaving the money in their account without touching it and letting the bank interest accrue. Furthermore, because of the machine learning model, the user can receive the money back prior to any necessary expenses which can be detected by the machine learning model(s) from patterns of spending in the transaction history.

It should be appreciated that the "user" who's account is being invested on a short-term basis may actually be an organization (i.e., with many users). Here, the software application may invest a larger portion of money that is only there for a short amount of time, such as from an organization's excess funds, payroll account, pension account, etc., and make the organization some significant interest in the short-term. Furthermore, the funds plus interest can be returned after only a few days or a few weeks, if necessary. Furthermore, the investment process may be repeatedly performed on a continuous/iterative basis. For example, every month the same process may be performed by the software application thus maximizing the interest on the account that would not be realized otherwise.

The investment strategy may vary widely and may include crypto-based assets such as stablecoins, liquidity pools, cryptocurrency, digital assets, more traditional investment opportunities (e.g., stocks, bonds, etc.) and the like. Here, the host platform may use an investment partner, such as a crypto-exchange, to convert the fiat-based funds from the bank account into crypto-based assets such as cryptocurrency and invest the crypto asset in a stablecoin or other digital asset. The host platform may also create a pre-programmed blockchain wallet which it then installs on a blockchain ledger of the recommended blockchain network (e.g., stablecoin, etc.) where the host platform suggest the user put their funds. The blockchain wallet, also referred to as a digital wallet, etc., may be pre-programmed to receive cryptocurrency from a crypto-exchange and transfer the received cryptocurrency (or the like) to a predefined smart contract which is identified by a smart contract ID, or the like, within the pre-programmed blockchain wallet.

The investment partner may provide the crypto-asset converted from the fiat funds to the pre-programmed blockchain wallet which then stakes the investment to a smart contract of a blockchain network, such as a stablecoin network. The benefit of using digital/crypto assets is that the exchanging and investing of fiat currency into crypto-assets, and vice versa, can be performed in a few seconds on a 24/7 basis, whereas trading stocks, bonds, and other financial assets can require multiple hours or days to transact between users through third-parties, as well as minimum fees, which may not be ideal when the money is only being invested for a few days or a few weeks.

Some of the benefits of the example embodiments include a novel approach to scoring idle cash using an architecture that enables a host platform to pull data, via an API, from one or more user accounts and then use that data to generate recommendations to the user on how best to add intermittent and temporary investment value.

Another benefit of the example embodiments is risk analysis and mitigation. Here, the host platform may monitor a temporary investment for problems and then act if a risk is perceived. For example, the host platform may install a smart contract on a blockchain ledger of the stablecoin network and monitor (read) changes and updates to the blockchain ledger. Here, the smart contract may read the ledger and provide such information to the security monitoring engine which can analyze the code updates to determine whether a code update may create a problem (hack, unstable, etc.). For example, the host platform may detect suspicious code, a suspicious user account, a suspicious blockchain transaction, or the like, being added to the blockchain ledger and pull the temporary investment out of the blockchain ledger in response. As another example, the host platform may detect anomalous wallet behavior—for example, someone is taking money in and out rapidly. There is a change to a baseline of a wallet behavior. The host may also detect this and pull the money out of the blockchain ledger in response.

Other benefits of the example embodiments include yield optimization which can identify the best yield, yield as a service API, and an end-to-end architecture where a customer remains in control of the funds even while they are temporarily and intermittently invested by the host platform in an automated manner.

The mobile application provided herein may be a platform where a user can log in and measure their treasury investments and also execute investments. For example, if the user wants to buy $50 k of Bitcoin, the host platform may purchase it for the user. If the user has treasury/assets of any kind the host platform can facilitate those investments in an automated manner. The system may be a standard way for businesses to invest in any asset they like using the application.

FIGS. 1A-1D illustrate a temporary investment process using machine learning in accordance with example embodiments. FIG. 1A illustrates an overall architecture 100 of the example embodiments. It should be appreciated that different systems and devices may be present in the network, and this is only for purposes of example. Referring to FIG. 1A, a host platform 120 may host a software application such as a mobile application or web application that performs temporary short-term investments in an automated fashion based on funds in a user's account. As further described in the examples herein, the host platform 120 may host an idle cash recommendation engine 122 (also referred to herein as a recommendation engine 122) which is a machine learning service with one or more machine learning models embodied therein that can be used to identify a temporary investment amount available within a financial account of a user based on historical patterns of account behavior identified from changes in account balance over time, patterns in spending, and the like. The host platform may also host a security monitoring engine shown in FIGS. 2A-2C that can monitor the temporary investment and pull the funds back to the user's account in response to a terminating event such as a security issue with the blockchain ledger.

In FIG. 1A, the user is represented by user device 110. The user may download the application (e.g., the mobile app) from an application marketplace or register with the application (e.g., a progressive web application, etc.) via a website. The user may provide information about themselves as well as a bank account identifier (e.g., account number, bank ID, etc.) of an account that the user would like to temporarily invest from.

The host platform 120 may receive the account identifier, identify a corresponding financial institution 130 that issued the account, and access transaction history, account balance history, etc., of the bank account from the financial institution, for example, via one or more API calls to an API of the financial institution 130. Here, the API call may include an identifier of the bank account of the user. In response, the financial institution 130 may provide transaction history from the bank account over a predetermined historical period of time (e.g., 2 years, 5 years, etc.) and transmit the account history information to the host platform 120. The account history may be analyzed by the recommendation engine to identify an amount of value/cash that can be safely invested.

Referring now to FIG. 1B, a process 150 of analyzing the account history information to provide the user with a recommended investment amount and time window is provided. Here, the user may actually be an organization with a payroll account where money typically sits and earns 0.2% interest. In this example, the host platform 120 may operate/access one or more machine learning models included within the recommendation engine 122 that can analyze the transaction history of the organization and provide a "safe" investment amount as well as a period of time in which the amount can be invested. According to various embodiments, the recommendation engine 122 may use the machine learning models (e.g., machine learning models 124 and 126, etc.) to identify a "floor" of value within the user's account which the user does not want to go below, and also add a cushion (e.g., a few thousand dollars, etc.) to the floor for additional safety and an amount of time that the value can be temporarily invested and then returned. Everything above the floor and the cushion may be recommend for investment. However, there may be predefined limits such as default limits or user-configured limits on the amount to invest. The safe investment amount may be determined such that a safe remaining balance remains in the bank account to cover expected expenses as well as some unexpected expenses rather than being invested.

For example, the organization may have $1,000,000 dollars in their payroll account. The one or more machine learning models may analyze the transaction history of the user including account balance history, expenses, timing information, etc., and identify a pattern of spending behavior and also a pattern of the account balance. Here, the machine learning models 124 and/or 126 may learn that the payroll account also is used for making payments on supplies every 3 months that can be of a significant expense (e.g., $75,000). The machine learning models 124 and/or 126 may also learn that the payment for supplies is to occur in 1 week. Therefore, the one or more machine learning models 124 and/or 126 may determine that $925,000 of the account balance is safe to invest. For example, the machine learning model 124 may be designed to determine a safe investment amount while the machine learning model 126 determines a temporary investment time period. It should also be appreciated that one machine learning model may determine both the amount and the time. In some embodiments, to incorporate a cushion, the recommendation engine 122 may add in a buffer of value to prevent the account from being overdrawn, for example, a buffer/cushion of $25,000. Therefore, the recommendation engine 122 may recommend a total investment amount of $900,000.

Furthermore, the machine learning model 126 may learn that the payroll account has a significant amount of historical fluctuation during the following month, for example, because of bonuses being paid out to employees, etc. In this case, the machine learning model 126 may recommend that the time window expire before the following month, which happens to be 3 weeks away. In this example, the recommendation engine 122 may combine the recommendations (temporary value+temporary time limit) and output a recommendation of investing $900,000 for a total of 18 days. This time period is determined by the recommendation engine 122 based on subtracting a period of time necessary to return the money to the account (e.g., 2 days, etc.). This information can be sent by the host platform 120 to a front-end of the application on the user device 110.

Referring now to FIG. 1A and FIG. 1C, the host platform 120 may perform a process 160 of transferring the funds from a financial account of the user held by the financial institution server 130 to a crypto-investor 140 for the purpose of a short-term investment only on a blockchain ledger 154 of a blockchain network recommended for temporary investment by the recommendation engine 122. As part of this process, the host platform 120 may generate a pre-programmed blockchain wallet 112 which it installs on the blockchain ledger 162 and which is pre-programmed to move funds added thereto into predefined investment locations on the blockchain ledger 154 (i.e., predefined smart contracts, etc.) For example, details and attributes such as account numbers, access credentials, keys, and the like, may be hardcoded into the pre-programmed blockchain wallet 112 thereby ensuring that the investment is delivered directly to the location selected by the user. The digital keys for accessing the blockchain wallet 112 may be delivered to the user device 110 by the host platform 120 thus providing the user with the ability to review and monitor the funds on their own.

The crypto-investor 140 may be a crypto-exchange configured to convert fiat-based funds, such as cash, into crypto-based assets such as cryptocurrency, etc. Here, the host platform 120 may act as an agent for the user and receive an authorization from the user device 110 to invest a predetermined amount of money for a predetermined amount of time, such as the $900,000 for 18 days, in the example given above. The host platform 120 may also receive "authorization" from the user device 110 to automatically pull the money out of the payroll account, and return the money to the payroll account within the 18 day period, or less. In response, the host platform 120 may transfer funds from the financial account hosted by the financial institution 130 to the crypto-investor 140. The crypto-investor 140 may convert the funds (fiat currency) into a crypto-asset (e.g., Bitcoin, stablecoin, liquidity funds, etc.) and then invest the crypto-asset in any number of blockchain-based networks including blockchains 151, 152, 153, etc., such as stablecoin networks which allow staking to smart contracts.

As shown in FIG. 1C, in response to receiving the fiat currency from the host platform 120, the crypto-investor 140 may convert the fiat currency into cryptocurrency and submit/transfer the cryptocurrency to the pre-programmed blockchain wallet 112 installed on the blockchain ledger 154 of the blockchain 151. Furthermore, the crypto-investor 140 may give both the user of the user device 110 and the host platform 120 access to the blockchain wallet 112. For example, both the user device 110 and the host platform 120 may be given respective keys for accessing the blockchain wallet 112. The keys may provide the user of the user device 110 with the ability to read information about the investment from the blockchain ledger 154. The pre-programmed blockchain wallet 112 may execute a blockchain transaction and submit the blockchain transaction to blockchain peers of the blockchain 151 for storage on the blockchain 151. The investment of the temporary value occurs when the blockchain transaction from the pre-programmed blockchain wallet 112 is committed to the blockchain 151.

Figure 1D:
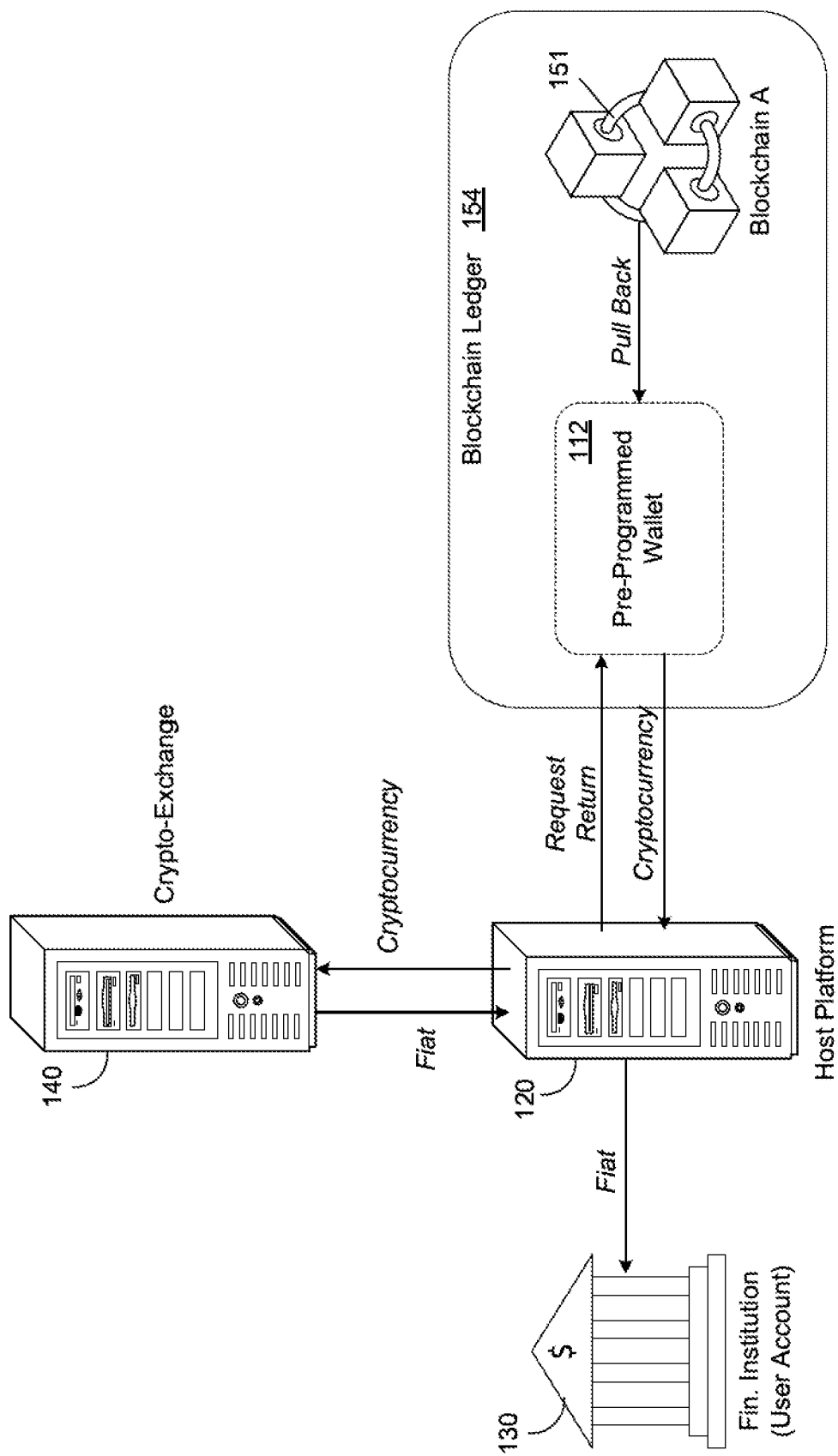

Referring now to FIG. 1D, a process 170 of pulling the funds out of the blockchain 151 and returning them back to the user's bank account in an automated manner is shown. Here, the crypto-investor 140 may have a predetermined investment strategy (e.g., submitted by the user, etc.) that is specified ahead of time. The crypto-investor 140 may temporarily invest the cryptocurrency in the blockchain wallet 112 on the blockchain ledger 154 until the predetermined period has expired (e.g., the 18 days are up), until a predetermined amount of interest has been earned (e.g., 10%, etc.), until a stop condition has been detected, and the like. Any of these conditions (and others) may trigger the crypto-investor 140 to pull the crypto-asset out of the blockchain 151, convert it back into fiat-based funds, and return the funds (plus interest) back to the user's account at the financial institution via the financial institution server 130. Here, the crypto-investor 140 may transfer/sell/exchange the cryptocurrency from the blockchain wallet 112 via another blockchain transaction executed by the blockchain peers of the blockchain 151, and convert the resulting cryptocurrency back into fiat currency. Next, the crypto-investor may return the fiat currency back to the financial institution server 130, which automatically puts the money (with the interest earned by the crypto-investor 140) back into the user's account at the financial institution 130.

As a result of the example embodiments, a traditional bank account that earns very little or no interest, can earn significantly more interest by performing intermittent and continuous short-term investments based on a combination of account history analysis and temporary crypto-investments that can yield substantially more interest than a traditional bank account. Furthermore, one or more of the host platform 120 and the crypto-investor 140 may take a small percentage for their role in the process.

Although not shown in the drawings, the host platform 120 may also provide automated "claimless" insurance for digital currency yield aggregators. In the cryptocurrency yield investing space, users are looking to take digital currencies like US dollars, etc., stake them (transfer them to a smart contract, chaincode, etc.) and earn interest by either lending the money out to borrowers, or earning from participating in currency exchange fees by providing liquidity. However, one of the biggest fears of users that prevents active participation is loss of principal funds. Even though many of these projects offer overcollateralized models that reduce the risk of 'investment loss', there are still cyber related risks that could create loss of funds due to exploits, bugs and fraud. This is not dissimilar to regular bank deposit risk where even the FDIC only insures up to $250,000 with a lot more liquidity and a lot more control and regulation on banks than what exists in the crypto space.

The most common approach to interest harvesting is investing in vaults or smart contracts that split the risk to multiple strategies. This allows further de-risking of principle loss and also yield optimization enabling the best return. These vaults are referred to as "yield aggregators." Some of them simply invest in multiple vaults and some of them do other things like auto compound earnings back into a principal amount to get more yield. For example, a user could invest $100, earn $5, and then the yield aggregator will put the extract $5 back so the user's account has $105 instead of $100. And the process is all automatic. Normally these vaults entice users by saying 'stake through me and you'll earn more'—in favor of users doing that, these vaults take a profit share of the enhanced earnings.

In the example embodiments, a new kind of vault (yield aggregator) is provided that provides a negative yield relative to the potential, but in favor, your principal funds are insured. In other words, the yield aggregator will take a percentage of any growth/interest earned on the principal, but the yield aggregator will also cover any losses to the principal funds, should the investment go bad/poorly. So instead of earning 5%, the user may earn 85% of 5% which is equal to 4.25% of the gains instead of the whole 5%. However, if the principal goes down from $100 to $80, the user would not lose anything and the yield aggregator would lose $20.

Figure 2A:
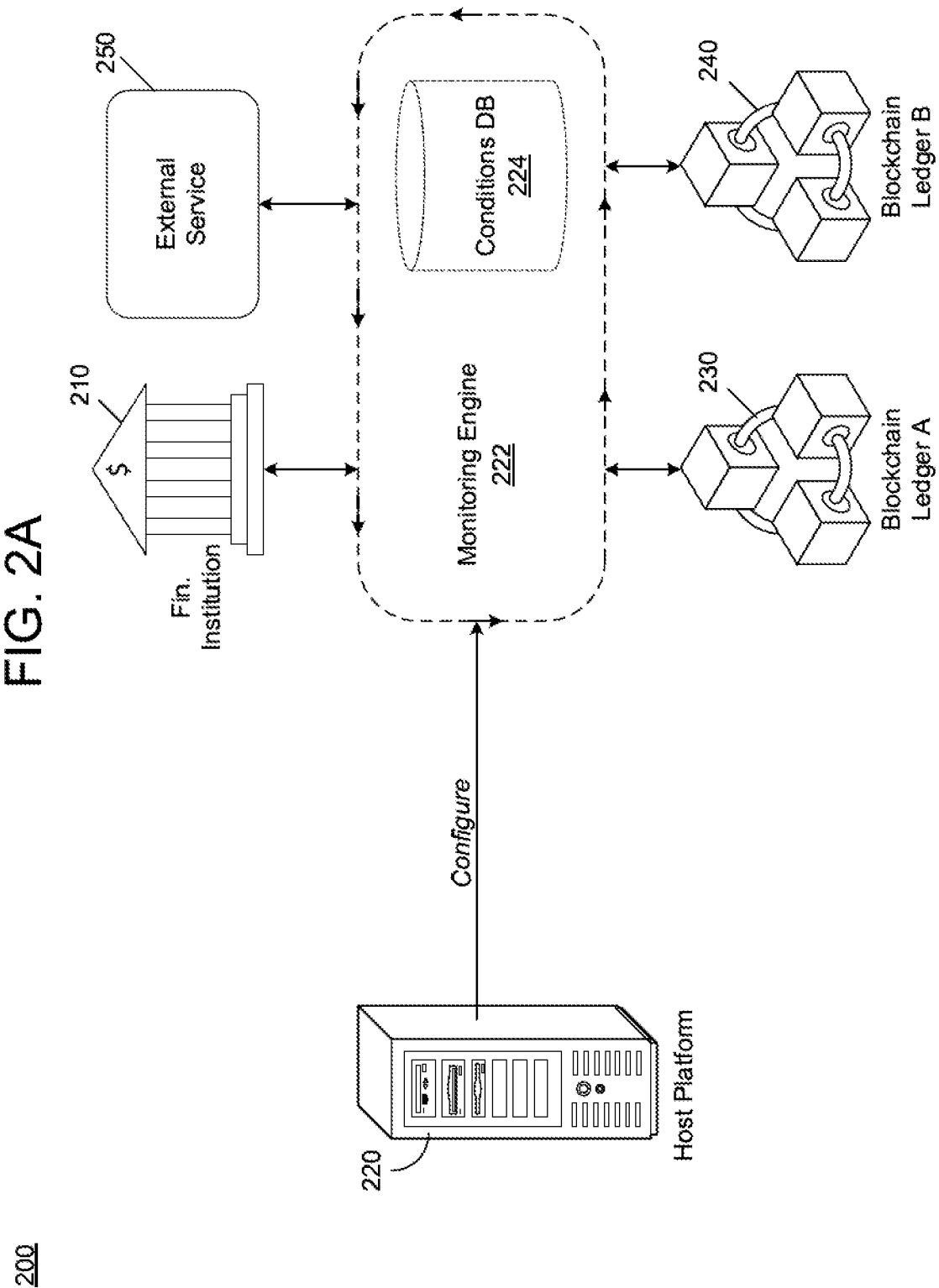
FIGS. 2A-2D are diagrams illustrating a process of monitoring a temporary investment for stop conditions in accordance with example embodiments.
Figure 2B:
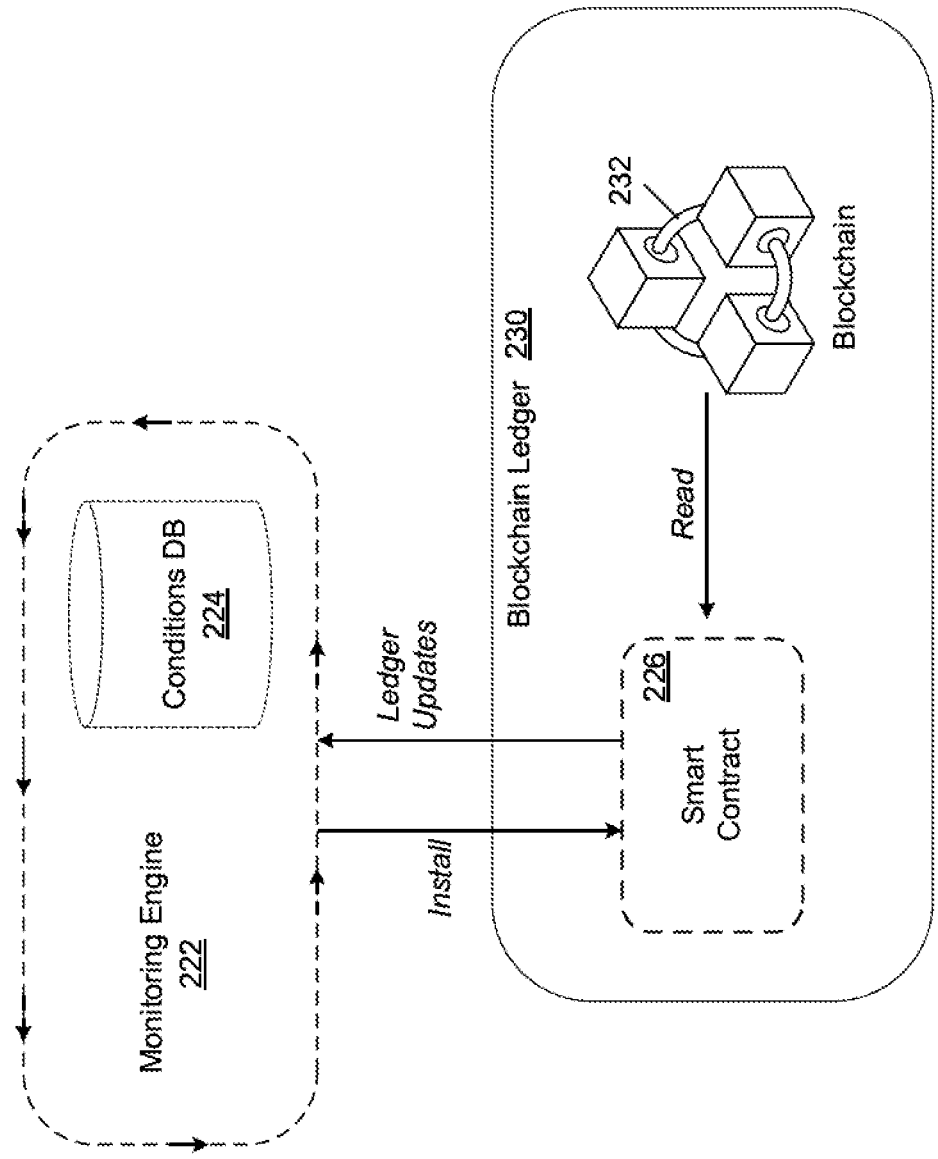
Figure 2C:
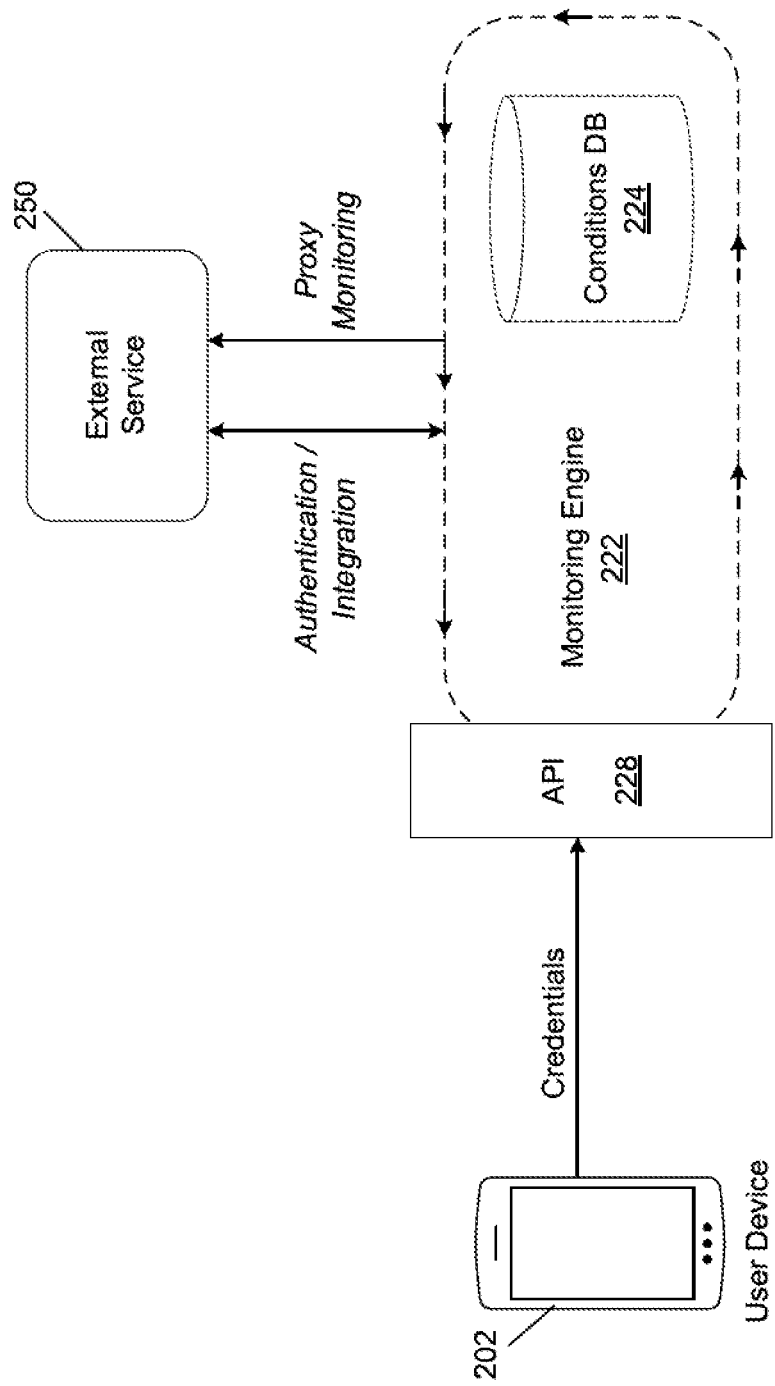

FIGS. 2A-2C illustrate a process of monitoring a temporary investment for stop conditions in accordance with example embodiments. As noted previously, a temporary investment may include a default termination point such as a particular point in time/date when the funds should be returned or a predefined amount of interest being earned which triggers the money to be returned. It should also be appreciated, that unexpected events may also be used to terminate a temporary investment before it has reached its default termination point. For example, the temporary investment may be pulled back early if the host platform detects a possible security issue or other issue such as the user's fiat-based account having a balance fall below a predefined safety threshold, etc.

Referring to FIG. 2A, there is shown a process 200 of a host platform 220 configuring a monitoring engine 222 to monitor various external data sources including a financial institution server 210, an external web service 250 (e.g., a Shopify account, etc.), a blockchain ledger 230, and a blockchain ledger 240. In this example, the host platform 220 has invested funds from a financial account of a user held by the financial institution server 210 in a blockchain stored on the blockchain ledger 230. Also, the host platform 220 has invested funds from the financial account of the user held by the financial institution server 210 in a blockchain stored on the blockchain ledger 240.

Here, the monitoring engine 222 may be configured to monitor updates to content stored on the blockchain ledgers 230 and 240, respectively, and determine whether issues arise that require either investment to be returned. For example, the host platform 220 may configure the monitoring engine 222 to identify suspicious code updates to blockchain software which are stored on a blockchain ledger, suspicious user accounts/blockchain wallets that are added to a blockchain ledger, suspicious blockchain transactions stored on a blockchain ledger, and the like. In this case, the monitoring engine 222 may be configured to analyze the different blockchain ledgers for stop conditions based on content updated on the blockchain ledger. The frequency of such analysis may be performed on a periodic basis (e.g., each time a new block is added to the blockchain ledger, etc.) As another example, the analysis may be performed on-demand from the user or some other entity.

According to various embodiments, the monitoring engine 222 may maintain a conditions database 224 with rules or statements therein which identify stop conditions for terminating a temporary investment. For example, the monitoring engine 222 may be configured to identify particular code updates that have been previously labeled as a security threat. As another example, the monitoring engine 222 may be configured to identify suspicious blockchain wallet identifiers or user identifiers. As another example, the monitoring engine 222 may be configured to identify suspicious transaction content such as suspicious amounts, suspicious frequencies of transactions, and the like. Any of these suspicious activities may be predefined as stop conditions. The stop conditions may also have threshold values or limits that must be reached or fallen below to be triggered.

As another example, the monitoring engine 222 may be configured to monitor the user's account at the financial institution via the financial institution server 210. For example, a stop condition may occur if an account balance of the user's account at the financial institution falls below a predefined threshold balance which may be configured by the user via the mobile application, etc. These conditions may also be stored in the conditions database 224. As another example, the monitoring engine 222 may monitor the external service 250 which may be used for purchasing goods from the user (e.g., the user's business, etc.)

In addition to stop conditions, the conditions database 224 may also store "start" conditions as well. As an example, the monitoring engine 222 may be configured to monitor the user's business transactions within the external service 250 (such as a SHOPIFY® account, etc.) to determine whether a start condition has been met. A start condition may occur when the user's business sells a predetermined amount of value (e.g., $1000) or a predetermined number of sales (e.g., 20 sales, etc.) If a start condition is detected, the monitoring engine 222 may notify the host platform 220 which may trigger an auto-investment of temporary value based on the sales (e.g., 20% of the sales, etc.) into a new temporary investment for the user.

The monitoring process performed by the monitoring engine 222 may be cyclical/repetitive. The frequency at which the monitoring process is repeated may be every time a new block is added to the respective blockchain. As another example, the frequency of the monitoring process may be predefined based on time (e.g., daily, weekly, monthly, etc.). As another example, the frequency of the monitoring process may be dynamic, random, requested by the user, etc. It should also be appreciated that different external data sources may have different monitoring frequencies. For example, the blockchain ledger 230 may be monitored each time a new block is added (which may be approximately every 5 minutes) while the external service 250 may be analyzed once a day, etc.

FIG. 2B illustrates an example of a process 260 of monitoring the blockchain ledger 230 via the monitoring service 222 in accordance with example embodiments. The monitoring process may be performed when a user's fiat currency is converted and invested into a digital asset managed by a blockchain 232 on the blockchain ledger 230. Referring to FIG. 2B, the monitoring engine 222 may install a smart contract 226 on the blockchain ledger 230 which is configured to monitor updates to the blockchain 232 of the blockchain ledger 230 including transactions committed to the blockchain 232, code updates made to the blockchain 232, blockchain wallets/users added to the blockchain 232, and the like.

Here, the monitoring service 222 may establish a communication channel between the monitoring engine 222 and the smart contract 226 stored on the blockchain ledger 230. For example, the monitoring engine 222 may install the smart contract 226 on a blockchain peer (not shown) that manages the blockchain ledger 230. There may be multiple peers that co-manages the ledger and agree on changes to the blockchain ledger 230 before they are made. Here, a communication channel may be established between the smart contract 226 on the blockchain peer/blockchain ledger 230 and communication may be performed between the smart contract 226 and the monitoring engine 222 via the communication channel.

The smart contract 226 may include read access to the blockchain 232 and may transmit blockchain ledger content read from the blockchain 232 and/or the blockchain ledger 230 to the monitoring engine 222 via the established communication channel. For example, code updates to the blockchain 232, blockchain transactions committed to the blockchain 232, updates to the users of the blockchain 232, and the like, may be forwarded to the monitoring engine 222 when detected/read by the smart contract 226. The monitoring engine 222 may compare the received/read blockchain content from the smart contract 226 to stop conditions stored in the conditions database 224. If a stop condition is detected/satisfied by a content update to the blockchain 232, the monitoring engine 222 may trigger a return of the investment in the digital asset from the blockchain 232. Here, the host platform 220 may trigger a crypto-exchange server to sell the digital asset, and if necessary, convert the proceeds from digital asset to fiat currency, and return the fiat currency to a user's financial account at a financial institution.

FIG. 2C illustrates a process 270 of monitoring the external service 250 for start conditions (or stop conditions) in accordance with example embodiments. Referring to FIG. 2C, the user may integrate access credentials (username, password, PIN, account number, etc.) into the monitoring engine 222 via an application programming interface (API) 228 of the monitoring engine 222. Here, the access credentials may be used by the monitoring service 222 to establish a communication channel (authenticated) between the monitoring engine 222 and the external service 250. Accordingly, the monitoring engine 222 can monitor business transactions, sales, or the like, of the user within the external service 250 via the established channel, and compare the transaction data to conditions in the conditions database 224 to determine whether to start an investment or stop/return an investment. In this scenario, the monitoring engine 222 acts as a proxy for the user and bridges together the external service 250 and the temporary investment performed on a blockchain ledger.

Figure 2D:
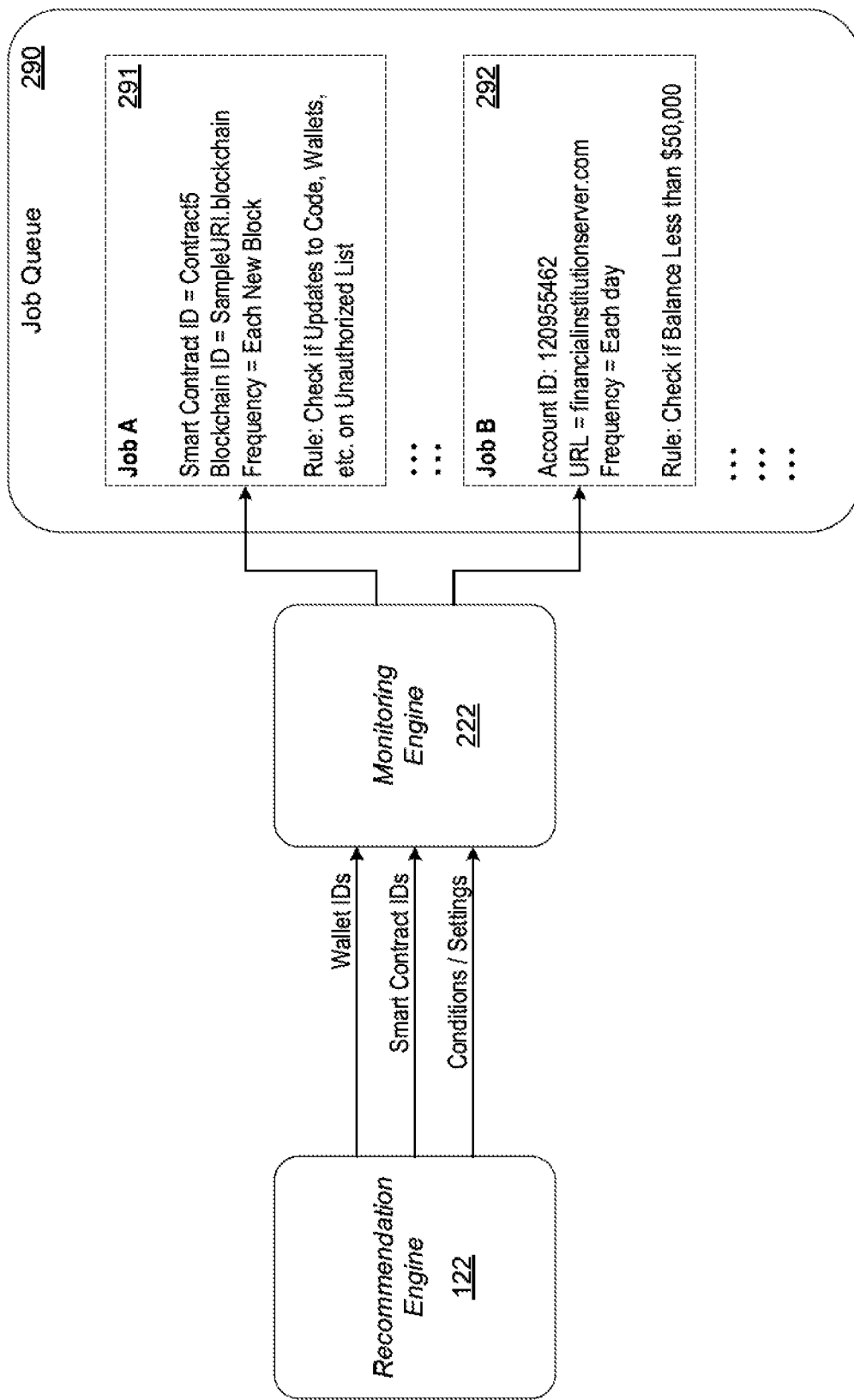

FIG. 2D illustrates a process 280 of the host platform configuring and managing monitoring jobs using a job queue 290. In this example, the host platform hosts the recommendation engine 122 and the monitoring engine 222, but embodiments are not limited thereto. In some cases, the monitoring engine 222 may be hosted separately from the recommendation engine 122 or not in communication with the other at all. It should also be appreciated that other systems and devices may be integrated.

Referring to FIG. 2D, the recommendation engine 122 may configure the monitoring engine 222 to perform monitoring jobs based on recommended investments that are approved by a user. For example, the recommendation engine 122 may provide the monitoring engine 222 with details of each monitoring job including a smart contract identifier, a blockchain URL, a monitoring frequency, one or more monitoring rules or conditions, and the like. The monitoring engine 222 may generate entries such as entries 291 and 292 within the job queue 290 which are periodically executed by the host platform. For example, a time-to-live (TTL) job or the like, may be programmed and executed for each job in the job queue 290. The TTL may include a timer. When the timer expires, a notification may be forward from the TTL job or the host platform itself to the monitoring engine 222 to perform another analysis of the external data source.

FIG. 3A illustrates a communication sequence 300A of a temporary investment process in accordance with example embodiments. Referring to FIG. 3A, a user may register with the host platform (e.g., a recommendation engine 310) in 331 via a user device 305 such as a mobile device which has a front-end of the software application installed therein. The registration process may include the user installing a front-end of a software application hosted by the host platform and uploading account details such as accounts where the host platform is authorized to analyze and make temporary investments to a back-end of the software application which includes the recommendation engine 310. The registration process may also enable the user to choose various investment settings including preferred types of investments, stop conditions, investments not approved, and the like. In 332, the recommendation engine 310 may access a financial account of the user at a financial institution server 325 based on the account details provided during the registration process. The recommendation engine 310 may retrieve account history details in 333 from the financial account of the user.

In 334, the recommendation engine may input transaction history data into one or more machine learning models which identify an available amount of idle cash within the user's account which is safe for investment, and a temporary amount of time for the available amount of idle cash to be invested. In 335, the recommendation engine 310 may transmit a recommendation or recommendations to the user device 305 with options to allow the user to authorize such investments. As an example, FIG. 4 illustrates a process 400 of displaying a plurality of investment options on a user interface of a front-end 424 of a software application installed on a user device 410. The options may be generated and displayed by a back-end 422 of the software application which is hosted by a host platform 400. Here, the host platform may correspond to the host platform which hosts the recommendation engine 310 and the monitoring engine 315 shown in FIGS. 3A-3B.

Referring again to FIG. 3A, the user may approve of a recommended investment option by pressing on a selection or inputting some sort of command into the front-end of the software application in 336. In response, the recommendation engine 310 may generate a pre-programmed blockchain wallet and install the wallet on a blockchain ledger 330 of a selected blockchain network where the investment is to take place in 337. Furthermore, in 338, the recommendation engine 310 may trigger a start of the investment by sending a request to a crypto-exchange server 320 with the details of the pre-programmed blockchain wallet such as a wallet ID, URI, etc., and sending a request to the financial institution server 325 with an amount of money to forward to the crypto-exchange server 320.

In 339, the financial institution server 325 transfers fiat currency to the crypto-exchange server 320, and in 341, the crypto-exchange server 320 converts the fiat currency into a corresponding amount of cryptocurrency or some other digital asset, and provides the digital asset to the pre-programmed blockchain wallet stored on the blockchain ledger 330. Furthermore, in 342, the crypto-exchange server 320 sends confirmation of the transfer to the recommendation engine 310.

Figure 3B:
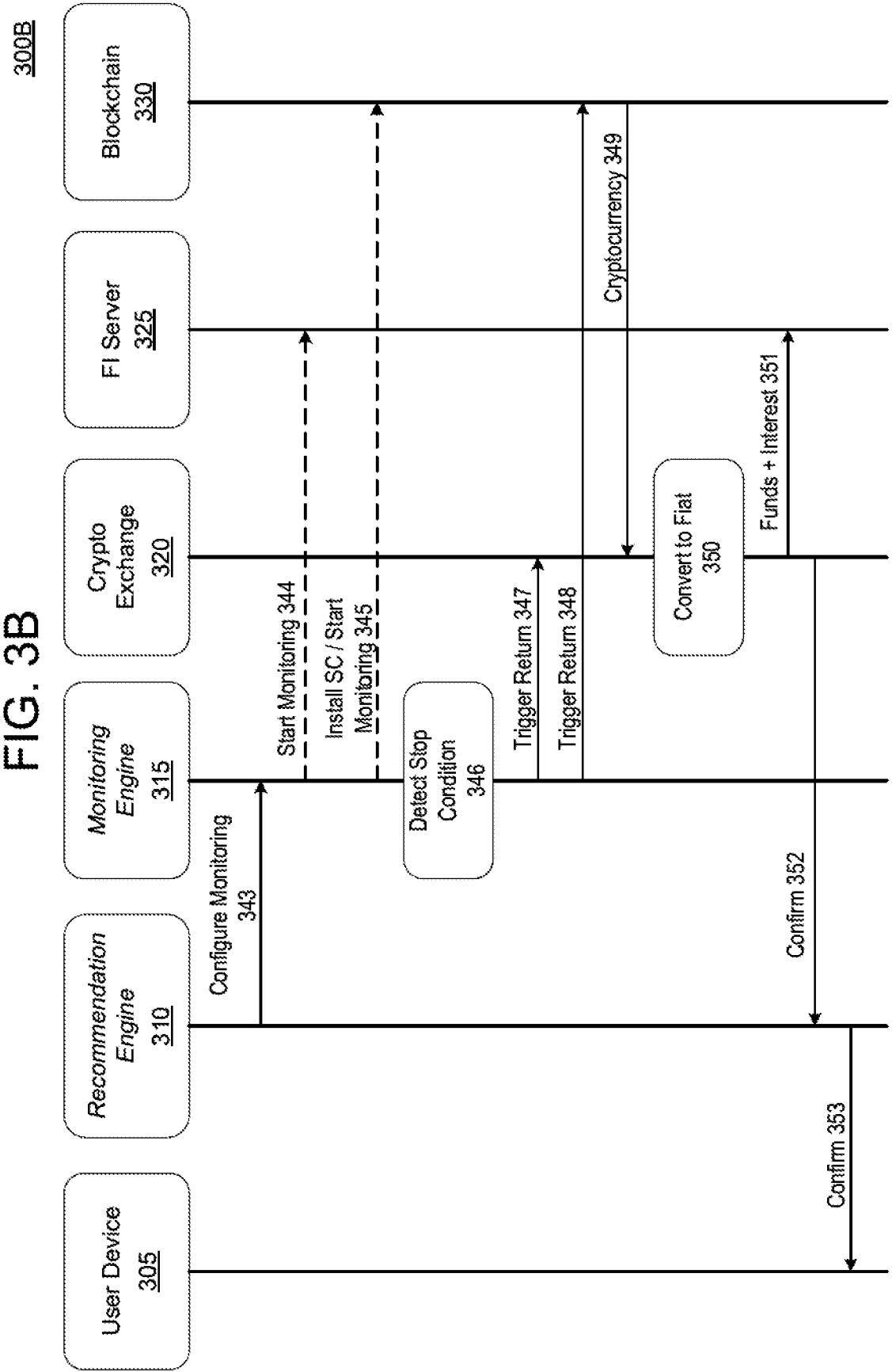
FIG. 3B is a diagram illustrating a communication sequence of a security monitoring process in accordance with example embodiments.
Figure 4:
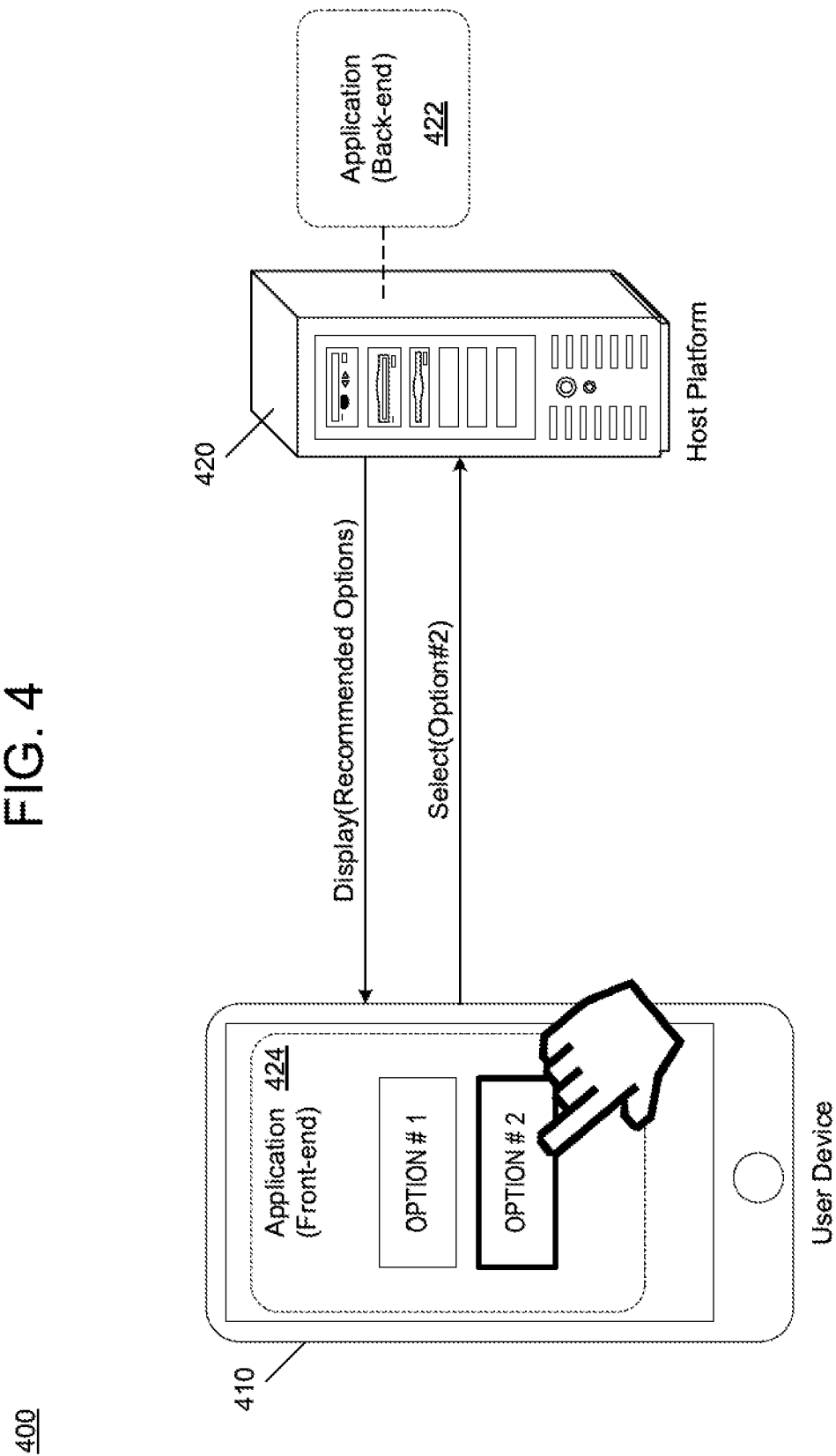
FIG. 4 is a diagram illustrating a process of providing a user with options for selecting a temporary investment in accordance with example embodiments.

FIG. 3B illustrates a communication sequence 300B of a security monitoring process in accordance with example embodiments. Here, the communication sequence 300B may be performed in sequence with the communication sequence 300A shown in FIG. 3A, however, embodiments are not limited thereto, and these processes may be performed separately and mutually exclusively.

Referring to FIG. 3B, in 343, the recommendation engine 310 configures settings for a monitoring job for monitoring the temporary investment approved by the user. For example, the configuring may configure the monitoring engine 315 with URLs, smart contract identifiers, frequencies of monitoring, financial accounts to monitor and access credentials to such financial accounts, external services to monitor and access credentials to such external services, and the like. In 344, the monitoring engine 315 begins monitoring a financial account of the user to detect if the user's account balance falls below a predefined threshold. Likewise, in 345, the monitoring engine 315 installs a smart contract on the blockchain ledger 330 and begins monitoring the ledger for security issues such as described in the processes of FIGS. 2A-2C.

In 346, as a result of the monitoring, the monitoring engine 310 detects a stop condition which terminates an investment early. In 347, the monitoring engine 310 triggers a return of the investment with the crypto-exchange server 320, for example, via a request message or API call, and in 348 the monitoring engine 310 triggers a return of the investment with the pre-programmed digital wallet installed on the blockchain ledger 330 which is pre-configured/hardcoded to return the funds to the user's financial account to the crypto-exchange server 320. In response, the blockchain wallet returns the crypto-asset to the crypto exchange server 320, which converts the crypto-asset to fiat currency in 350 and returns the fiat currency back to the user financial account at the financial institution server 325, in 351. In 352, the crypto-exchange server 320 transmits confirmation of the return to the recommendation engine 310 which sends the confirmation to the user device 305.

Figure 5:
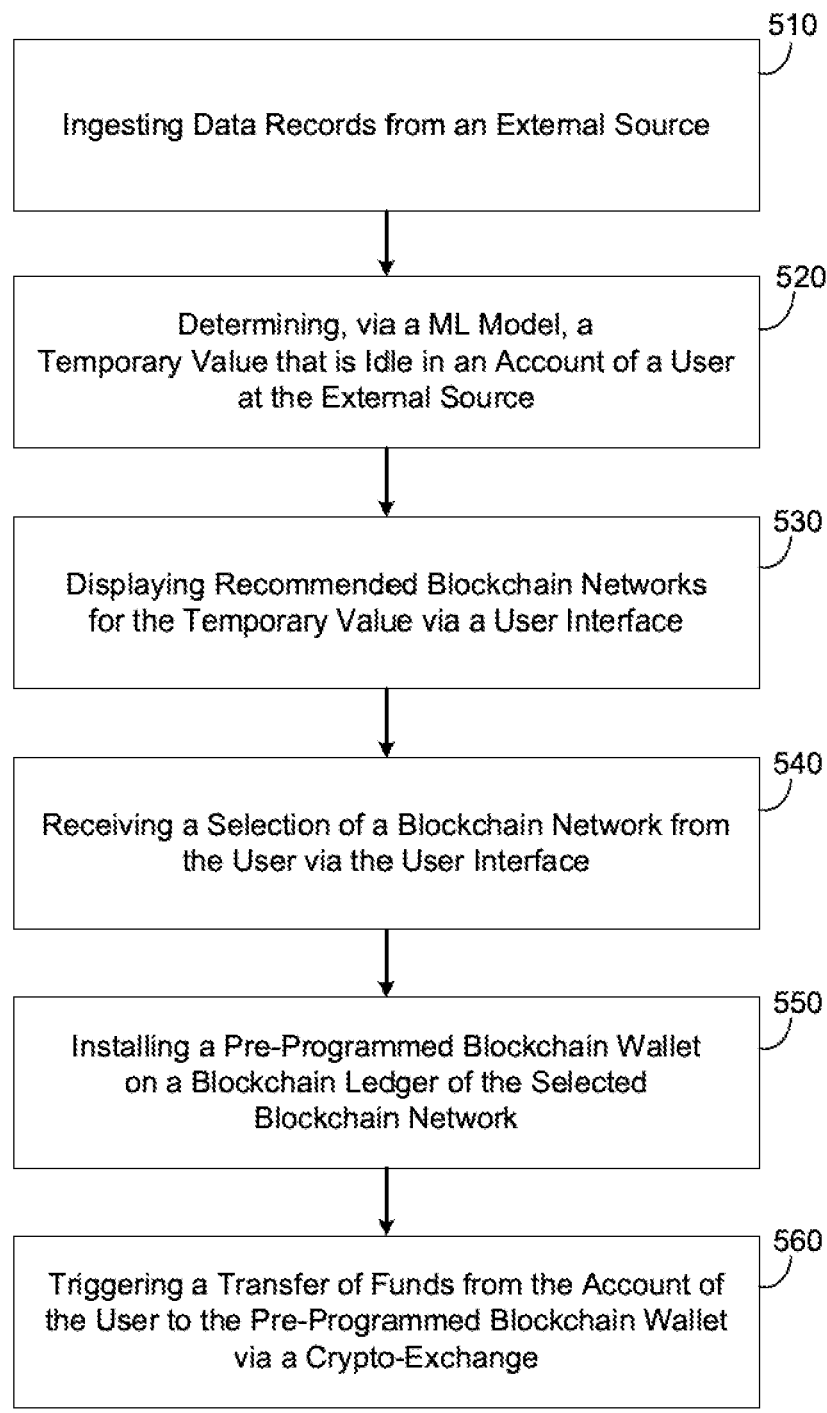
FIG. 5 is a diagram illustrating a method for recommending and performing a temporary investment in accordance with example embodiments.

FIG. 5 illustrates a method 500 for recommending and performing a temporary investment in accordance with example embodiments. For example, the method 500 may be performed by the host platform 120 shown in FIGS. 1A-1D, or the like. Referring to FIG. 5, in 510, the method may include ingesting data records of a user from an external data source via a backend of a software application hosted by a host platform. The data records may include account statements, transaction history, documents, and the like, with financial transaction history of the user. In 520, the method may include determining, via execution of a machine learning model on the ingested data records, a temporary value that is idle in an account of the user hosted by the external data source and a period of time that the temporary value is idle based on the ingested data records.

In 530, the method may include displaying, via a user interface on a front-end of the software application on a user device, the determined temporary value, the period of time, and one or more recommendations of one or more blockchain networks. An example of the user interface is shown in FIG. 4. In 540, the method may include receiving authorization and a selection of a blockchain network from the user interface on the front-end of the software application. In 550, the method may include installing a pre-programmed blockchain wallet on a blockchain ledger of the selected blockchain network. In 560, the method may include triggering a transfer of funds from the account of the user hosted by the external data source to the pre-programmed blockchain wallet on the blockchain ledger via a crypto-exchange server which converts the funds to cryptocurrency prior to the transfer.

In some embodiments, the installing may include pre-programming the blockchain wallet to stake cryptocurrency received from the crypto-exchange server to a predefined smart contract on the blockchain ledger of the selected blockchain network based on an identifier of the predefined smart contract stored in the pre-programmed blockchain wallet. In some embodiments, the method may further include receiving access credentials of the user to a remote web service via an application programming interface (API) and establishing a remote monitoring channel for monitoring user transactions performed via the remote web service based on the received access credentials. In some embodiments, the method may further include detecting a start condition based on the monitoring of the user transactions via the remote monitoring channel, and in response, displaying, via the user interface on the front-end of the software application on the user device, the determined temporary value, the period of time, and the one or more recommendations of one or more blockchain networks.

In some embodiments, the triggering may include transmitting a first trigger request message to the external data source which controls the external data source to submit funds to the crypto-exchange server, and transmitting a second trigger request message to the crypto-exchange server which comprises a request to convert the funds to cryptocurrency and a wallet identifier of the pre-programmed blockchain wallet on the blockchain ledger where the cryptocurrency should be delivered. In some embodiments, the method may further include receiving inputs via the user interface of the front-end of the software application and configuring start and stop conditions of the transfer of funds within a conditions database using the received inputs from the user interface of the front-end of the software application.

In some embodiments, the method may further include detecting a stop condition has occurred based on the stop conditions stored within the conditions database, and triggering the pre-programmed blockchain wallet to return the cryptocurrency from the blockchain ledger to the crypto-exchange server in response to the detected stop condition. In some embodiments, the determining may include determining, via execution of the machine learning model, a maximum value in the account of the user available for transfer to the pre-programmed blockchain wallet based on a pattern of recurring expenses in the account of the user, and determining the temporary value by subtracting a safety buffer value from the maximum value. In some embodiments, the determining may include determining, via execution of the machine learning model, a temporary period of time for investing the temporary value based on a pattern of recurring expenses in the account of the user.

Figure 6:
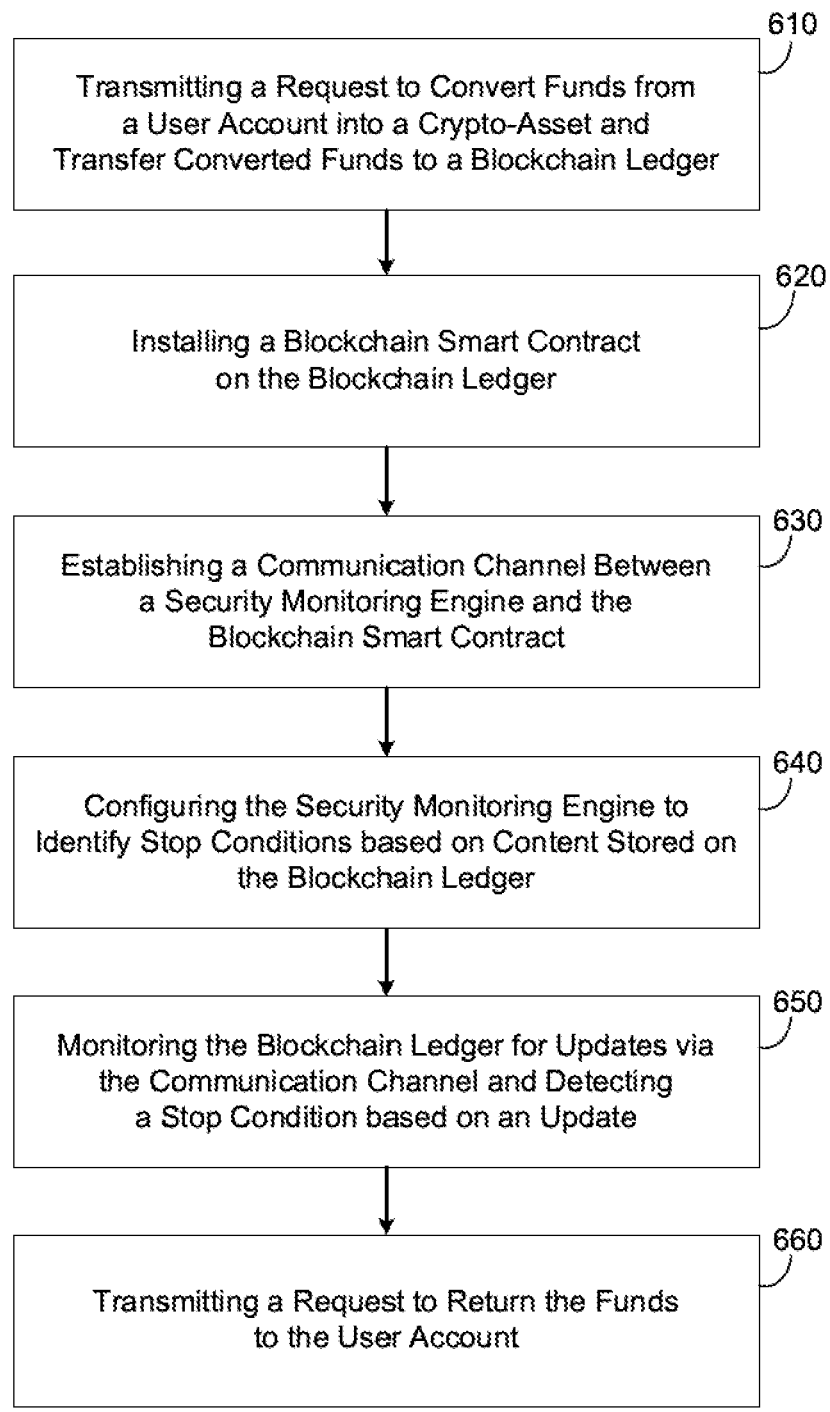
FIG. 6 is a diagram illustrating a method for monitoring a temporary investment in accordance with example embodiments.

FIG. 6 illustrates a method 600 for monitoring a temporary investment in accordance with example embodiments. For example, the method 600 may be performed by the host platform 120 shown in FIGS. 1A-1D, or the like. Referring to FIG. 6, in 610, the method may include transmitting a request to a crypto-exchange server to convert funds from an account of a user with an external data source to a crypto asset and store the crypto asset on a blockchain ledger of a blockchain network. For example, the funds may include cash or other assets stored within a bank account, credit account, checking account, savings account, payroll account, or the like.

In 620, the method may include installing a blockchain smart contract on the blockchain ledger of the blockchain network with read access to content stored on the blockchain ledger. In 630, the method may include establishing a communication channel between a monitoring engine and the blockchain smart contract. In 640, the method may include configuring the monitoring engine to identify stop conditions within content stored on the blockchain ledger. In 650, the method may include monitoring the blockchain ledger for updates to content stored on the blockchain ledger via the communication channel between the monitoring engine and the blockchain smart contract and detecting a stop condition based on an update to the blockchain ledger via the monitoring engine. In 660, the method may include, in response the detected stop condition, transmitting a request to the crypto-exchange server to return the funds to the external data source.

In some embodiments, the monitoring may include iteratively reading updates to content stored within the blockchain ledger via the blockchain smart contract and comparing the updates to predefined security risks that are stored in a security profile of the monitoring engine. In some embodiments, the monitoring may include executing a new iteration of the reading of the updates via the blockchain smart contract each time a new block is added to the blockchain ledger by the blockchain network. In some embodiments, the configuring may further include establishing a communication channel between the monitoring engine and the external data source, configuring the monitoring engine to identify stop conditions based on changes to account data stored by the external data source, and monitoring updates to the account data via the established channel between the monitoring engine and the external data source.

In some embodiments, the monitoring may include monitoring for updates to blockchain chaincode installed on the blockchain ledger that do not satisfy a predetermined security criteria. In some embodiments, the monitoring may include monitoring for updates to user accounts of the blockchain ledger that are previously labeled as malicious user accounts. In some embodiments, the monitoring may include monitoring for de-pegging of the digital asset via the blockchain ledger. In some embodiments, the configuring may include configuring the monitoring engine to trigger a return of the funds from the crypto-exchange server at a default future time, and determining to request return of the funds from the crypto-exchange server prior to the default future time in response to the detected stop condition.

FIG. 7 illustrates an example of a server node 700 according to some embodiments which may perform the role of the host platform 120 shown in FIGS. 1A-1D. The server node 700 may include a general-purpose computing apparatus and may execute program code to perform any of the functions described herein. The server node 700 may comprise an implementation of a remote terminal or a host platform, in some embodiments. It should also be appreciated that the server node 700 may include other unshown elements according to some embodiments and may not include all of the elements shown in FIG. 7.

Server node 700 includes processing unit(s) 710 (i.e., processors) operatively coupled to communication device 720, data storage device 730, input device(s) 740, output device(s) 750, and memory 760. Communication device 720 may facilitate communication with external devices, such as an external network or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into the server node 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM). In some embodiments, the data storage device 730 may store user interface elements in tabular form. For example, one or more columns and one or more rows of user interface elements may be displayed in a two-dimensional spreadsheet, table, document, digital structure, or the like.

Application server 731 and query processor 732 may each comprise program code executed by processing unit(s) 710 to cause server node 700 to perform any one or more of the processes described herein. Such processes may include estimating a selectivity of a query on tables 734 based on statistics 733. Embodiments are not limited to execution of these processes by a single computing device. Data storage device 730 may also store data and other program code for providing additional functionality and/or which are necessary for operation of server node 700, such as device drivers, operating system files, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system for monitoring crypto-based investments, comprising:
a host platform comprising a server computing device in electronic communication via a communication network with a computing device of a user including a user interface, the host platform configured to receive an authorization from the user via the interface for the host platform to access account information of the user from a financial institution, wherein a computing device of the financial institution is in electronic communication with the host platform;
a monitoring engine in electronic communication with the host platform and configured to monitor a temporary investment for the user in crypto-based assets, wherein a conversion of user fiat funds to crypto-based assets is facilitated by a crypto-exchange server in electronic communication with the host platform;
wherein the host platform comprises one or more processors configured to:
determine, via execution of a machine learning model on the account information of the user, a temporary value of the user's funds that is temporarily idle in the account of the user;
display the determined temporary value, a period of time, and one or more recommendations of one or more crypto-asset blockchain networks via the user interface;
receive a selection of a blockchain network via the user interface;
install, via the monitoring engine, a smart contract on a blockchain ledger of the selected blockchain network, the smart contract being configured with read-only access to content stored on the blockchain ledger and establishes a communication channel between the blockchain smart contract on the blockchain ledger and the monitoring engine;
program a blockchain wallet to, via the crypto-exchange server, transfer funds to the smart contract installed on the selected blockchain network by embedding an identifier of the smart contract within the blockchain wallet;
install the programmed blockchain wallet on the blockchain ledger of the selected blockchain network;
determine, via execution of the machine learning model, a temporary period of time for a temporary investing of the temporary value based on a pattern of recurring expenses in the account of the user, the period of time having a beginning time and an ending time;
trigger, in response to receiving authorization from the user, a transfer of funds over the communication network from the account of the user to the programmed blockchain wallet on the blockchain ledger for the temporary period of time for the temporary investing of the temporary value;
receive, via the smart contract, new content that is added to the blockchain ledger by participants of the blockchain ledger via the established communication channel between the blockchain smart contract on the blockchain ledger and the monitoring engine,
detect, by the monitoring engine, suspicious ledger activity in at least one of a blockchain transaction and a code update included in the new content that is added to the blockchain ledger by the blockchain participants, wherein the suspicious ledger activity is detected from a list of suspicious ledger actions stored within a data store of the monitoring engine and comprising a security threat, a blockchain identifier identified as suspicious, a user identifier identified as suspicious, and transaction content identified as suspicious; and
in response to the detected suspicious ledger activity, transmit, via the monitoring engine and the host platform, a request to the crypto-exchange server to automatically terminate the temporary investing of the temporary value prior to the end of the investment period and trigger a return of the funds to the account of the user via the blockchain wallet.

2. The computing system of claim 1, wherein the one or more processors of the host platform are configured to iteratively receive, via the monitoring engine, updates to content stored within the blockchain ledger transmitted from the blockchain smart contract through the communication channel and compare the updates to predefined security risks that are stored in a security profile.

3. The computing system of claim 2, wherein the one or more processors are configured to iteratively receive the updates via the blockchain smart contract each time a new block is added to the blockchain ledger by the blockchain network.

4. The computing system of claim 1, wherein the one or more processors are configured to establish a second communication channel between the monitoring engine and an external data source, and monitor updates to account data stored by the external data source via the established second communication channel.

5. The computing system of claim 1, wherein the one or more processors are configured to monitor, via the monitoring engine, for updates to blockchain code installed on the blockchain ledger that do not satisfy a predetermined security criteria.

6. The computing system of claim 1, wherein the suspicious ledger activity further comprises addition of a user account to the blockchain ledger previously labeled as a malicious user account.

7. The computing system of claim 1, wherein the suspicious ledger activity comprises de-pegging of the digital asset via the blockchain ledger.

8. A method for monitoring crypto-based investments, comprising:
determining, via execution of a machine learning model on account information of a user, a temporary value of the user's funds that is temporarily idle in an account of the user;
displaying the determined temporary value, a period of time, and one or more recommendations of one or more crypto-asset blockchain networks via a user interface of a computing device of the user;
receiving a selection of a blockchain network via the user interface;
installing, via a monitoring engine, a smart contract on a blockchain ledger of the selected blockchain network, the smart contract being configured with read-only access to content stored on the blockchain ledger and establishes a communication channel between the blockchain smart contract on the blockchain ledger and the monitoring engine;
programming a blockchain wallet to, via a crypto-exchange server, transfer funds to the smart contract installed on the selected blockchain network by embedding an identifier of the smart contract within the blockchain wallet;

installing the programmed blockchain wallet on the blockchain ledger of the selected blockchain network;

determining, via execution of the machine learning model, a temporary period of time for a temporary investing of the temporary value based on a pattern of recurring expenses in the account of the user, the period of time having a beginning time and an ending time;

triggering, in response to receiving authorization from the user, a transfer of funds over the communication network from the account of the user to the programmed blockchain wallet on the blockchain ledger for the temporary period of time for the temporary investing of the temporary value;

receiving, via the smart contract, new content that is added to the blockchain ledger by participants of the blockchain ledger via the established communication channel between the blockchain smart contract on the blockchain ledger and the monitoring engine;

detecting, by the monitoring engine, suspicious ledger activity in at least one of a blockchain transaction and a code update included in the new content that is added to the blockchain ledger by the blockchain participants, wherein the suspicious ledger activity is detected from a list of suspicious ledger actions stored within a data store of the monitoring engine and comprising a security threat, a blockchain identifier identified as suspicious, a user identifier identified as suspicious, and transaction content identified as suspicious; and in response to the detected suspicious ledger activity, transmitting, via the monitoring engine and a host platform, a request to the crypto-exchange server to automatically terminate the temporary investing of the temporary value prior to the end of the investment period and trigger a return of the funds to the account of the user via the blockchain wallet.

9. The method of claim 8, wherein the monitoring comprises iteratively receiving, via the monitoring engine, updates to content stored within the blockchain ledger transmitted from the blockchain smart contract through the communication channel and comparing the updates to predefined security risks that are stored in a security profile.

10. The method of claim 9, wherein the iteratively receiving comprises iteratively receiving the updates via the blockchain smart contract each time a new block is added to the blockchain ledger by the blockchain network.

11. The method of claim 8, wherein the configuring further comprises establishing a second communication channel between the monitoring engine and an external data source, and monitoring updates to account data stored by the external data source via the established second communication channel.

12. The method of claim 8, wherein the monitoring comprises monitoring for updates to blockchain code installed on the blockchain ledger that do not satisfy a predetermined security criteria.

13. The method of claim 8, wherein the suspicious ledger activity further comprises addition of a user account to the blockchain ledger that is previously labeled as a malicious user account.

14. The method of claim 8, wherein the suspicious ledger activity comprises de-pegging of the digital asset via the blockchain ledger.

15. A non-transitory computer-readable medium comprising instructions which when executed by a processor cause a computer to perform a method for monitoring crypto-based investments, comprising:

determining, via execution of a machine learning model on account information of a user, a temporary value of the user's funds that is temporarily idle in an account of the user;

displaying the determined temporary value, a period of time, and one or more recommendations of one or more crypto-asset blockchain networks via a user interface of a computing device of the user;

receiving a selection of a blockchain network via the user interface;

installing, via a monitoring engine, a smart contract on a blockchain ledger of the selected blockchain network, the smart contract being configured with read-only access to content stored on the blockchain ledger and establishes a communication channel between the blockchain smart contract on the blockchain ledger and the monitoring engine;

programming a blockchain wallet to, via a crypto-exchange server, transfer funds to the smart contract installed on the selected blockchain network by embedding an identifier of the smart contract within the blockchain wallet;

installing the programmed blockchain wallet on the blockchain ledger of the selected blockchain network;

determining, via execution of the machine learning model, a temporary period of time for a temporary investing of the temporary value based on a pattern of recurring expenses in the account of the user, the period of time having a beginning time and an ending time;

triggering, in response to receiving authorization from the user, a transfer of funds over the communication network from the account of the user to the programmed blockchain wallet on the blockchain ledger for the temporary period of time for the temporary investing of the temporary value;

receiving, via the smart contract, new content that is added to the blockchain ledger by participants of the blockchain ledger via the established communication channel between the blockchain smart contract on the blockchain ledger and the monitoring engine;

detecting, by the monitoring engine, suspicious ledger activity in at least one of a blockchain transaction and a code update included in the new content that is added to the blockchain ledger by the blockchain participants, wherein the suspicious ledger activity is detected from a list of suspicious ledger actions stored within a data store of the monitoring engine and comprising a security threat, a blockchain identifier identified as suspicious, a user identifier identified as suspicious, and transaction content identified as suspicious; and in response the detected suspicious ledger activity, transmitting, via the monitoring engine and a host platform, a request to the crypto-exchange server to automatically terminate the temporary investing of the temporary value prior to the end of the investment period and trigger a return of the funds to the account of the user via the blockchain wallet.

16. The non-transitory computer-readable medium of claim 15, wherein the monitoring comprises iteratively receiving, via the monitoring engine, updates to content stored within the blockchain ledger transmitted from the blockchain smart contract through the communication channel and comparing the updates to predefined security risks that are stored in a security profile.

17. The non-transitory computer-readable medium of claim 15, wherein the iteratively receiving comprises iteratively receiving updates to blockchain code installed on the blockchain ledger.

18. The non-transitory computer-readable medium of claim 15, wherein the suspicious ledger activity further comprises addition of a user account to the blockchain ledger that is previously labeled as a malicious user account.

* * * * *